(12) United States Patent
De Los Santos Gualque

(10) Patent No.: US 10,791,748 B2
(45) Date of Patent: Oct. 6, 2020

(54) DEVICE FOR CUTTING CHICKEN, BEEF AND PORK MEAT INTO SMALL PIECES

(71) Applicant: Jose De Los Santos Gualque, Bogota (CO)

(72) Inventor: Jose De Los Santos Gualque, Bogota (CO)

( * ) Notice: Subject to any disclaimer, the term of this patent is extended or adjusted under 35 U.S.C. 154(b) by 16 days.

(21) Appl. No.: 16/308,751

(22) PCT Filed: Jun. 6, 2017

(86) PCT No.: PCT/IB2017/000702
§ 371 (c)(1),
(2) Date: Dec. 10, 2018

(87) PCT Pub. No.: WO2017/216622
PCT Pub. Date: Dec. 21, 2017

(65) Prior Publication Data
US 2019/0150459 A1   May 23, 2019

(30) Foreign Application Priority Data
Jun. 16, 2016   (CO) .................................. 16-158163

(51) Int. Cl.
*A22C 17/00* (2006.01)
*B02C 18/18* (2006.01)
(Continued)

(52) U.S. Cl.
CPC .......... *A22C 17/0006* (2013.01); *A22C 17/00* (2013.01); *B02C 18/142* (2013.01);
(Continued)

(58) Field of Classification Search
CPC .. A22C 17/00; A22C 17/0026; A22C 17/0033
See application file for complete search history.

(56) References Cited

U.S. PATENT DOCUMENTS 672,126 A * 7/1901 Hickey
743,742 A * 11/1902 Munn
(Continued)

*Primary Examiner* — Richard T Price, Jr.
(74) *Attorney, Agent, or Firm* — Luis Figarella

(57) ABSTRACT

The invention relates to a machine for loosening or cutting the different fibres of the meats for human consumption into small pieces, such as chicken, beef, pork meat or meat from any animal with fibres. This is characterized by having two parallel shafts that rotate in the same direction, wherein by introducing the meat between the two blade-carrying shafts, in relation to the blades of the opposing blade-carrying shaft, permitting the tearing up of the fibres of the meat with the blades, the size of the cut pieces are determined according to the distance between the blades of one blade-carrying shaft and the other with which they intersect. This machine has different transmission means for moving the blade-carrying shafts with the motor force of the motor, given that they engage with the shaft having a speed reducer, which in turn engages with the blade-carrying shafts, wherein these can be pinions that engage with one another or via chains or via pulleys having bands, wherein these cutting machines can be used with combination gear means, as well as pulleys with bands and pinions with chains, which engage with one another or vice versa, wherein the blade-carrying shafts are disposed to be used with peripheral groups in a line of up to 4, 6 and 8 blades on each of the two blade-carrying shafts, and wherein the size of the fibres loosened from the bulk of the fibres is determined by the distance and speed present between the linear peripheral sets between each blade-carrying shaft.

20 Claims, 13 Drawing Sheets

(51) Int. Cl.
    *B02C 18/14*        (2006.01)
    *B02C 18/24*        (2006.01)

(52) U.S. Cl.
    CPC ............ *B02C 18/145* (2013.01); *B02C 18/18* (2013.01); *B02C 18/24* (2013.01)

(56) References Cited

U.S. PATENT DOCUMENTS

| | | | | |
|---|---|---|---|---|
| 843,898 | A | * | 2/1907 | Lace |
| 1,692,574 | A | * | 11/1928 | Roessler ................. A47J 19/00 |
| | | | | 452/147 |
| 1,889,192 | A | * | 11/1932 | Bruce ................... A22C 9/004 |
| | | | | 452/143 |
| 1,986,076 | A | * | 1/1935 | Spang .................... A22C 9/008 |
| | | | | 452/142 |
| 2,026,505 | A | * | 12/1935 | Bailey ..................... C10G 9/14 |
| | | | | 208/77 |
| 2,263,855 | A | * | 11/1941 | Spang ..................... B26D 3/08 |
| | | | | 452/148 |
| 2,291,809 | A | * | 8/1942 | Jackson .................. B26D 3/22 |
| | | | | 83/884 |
| 2,420,549 | A | * | 5/1947 | McKee .................. A22C 9/004 |
| | | | | 452/142 |
| 5,340,354 | A | * | 8/1994 | Anderson .............. A22C 9/004 |
| | | | | 452/142 |
| 6,419,575 | B1 | * | 7/2002 | Ota ........................ A22C 25/00 |
| | | | | 452/106 |
| 8,764,524 | B2 | * | 7/2014 | Lagares Corominas .................... |
| | | | | A22C 9/004 |
| | | | | 452/142 |

\* cited by examiner

DEVICE FOR CUTTING CHICKEN, BEEF AND PORK MEAT INTO SMALL PIECES

CROSS-REFERENCE TO RELATED APPLICATIONS

This application is a National Entry Stage of PCT/IB2017/000702, "DEVICE FOR CUTTING CHICKEN, BEEF AND PORK MEAT INTO SMALL PIECES", filed on Jun. 6, 2017 the disclosure of which is herein incorporated by reference in its entirety.

FIELD OF THE INVENTION

This invention relates to the processing of meats, and specifically with the shredding of said meats, such as beef, chicken, pork, etc. used in the preparation of foods or food products that contain shredded meat, such as 'empanadas' (turnovers), tamales, pasta, burritos, pizzas and other similar dishes. These processes are usually carried out through the manual powered shredding of meats. The sector of this invention is metalworking and deals with the process of shredding chicken, beef or pork with an automated machine.

OBJECT OF THE INVENTION

The principal object of the invention is to allow the shredding of large quantities of meat in a short time.

Another important object is the ability to grade the diameter of the shredded meats, depending on the distances set between the groups of blades linearly placed on the two blade carrying axles.

A further objective is to allow the aseptic handling of the meat, as the operator need not touch the meat, and as the product is manufactured in stainless steel.

This invention accelerates the times, the efficiency and the overall aseptic qualities of the process, which translates to money savings.

DESCRIPTION

This invention is about a shredding machine 1, which loosens/releases (shredding or 'desmechando') the fibers in the various meats for human consumption, it is designed to afford a high yield in the shredding of beef or chicken having a main purpose of saving time, reducing the handling of the meats during the shredding. This is characterized by having two axles for mounting the blades 3 and 4, in parallel, turning in the same direction, each axle having a variety of blades 2, placed in equidistant distances along a peripheric line between them, with a possible adjustment to the beginning of the line of either axle 3 or 4, so that when the axles are assembled near each other, the blade assemblies 2 of each axle remain interspaced so that when they rotate they keep the line and separation, avoiding contact between the blades. To shred the pieces of meat, the pieces fall from a tray placed on the upper portion of the machine, through a tube that brings the pieces of meat to the center of the of the blade axles 2 and 3, which shred the meat into the center of the rotating blades 2, which shred the meats through the action of the blades 2, which at the center point counter-rotate 16, and determine the size of the shredded meat according to the distance between the axles and the blades. This machine 1, works with different components for the transmission of the driving force from the motor to the blade carrying axles, shredders 3 and 4, through transmission components such as chains 9, pinions 8, bands 7, pulleys 6 and pinions 10, which mesh with each other using a fourth pinion 10 to transmit power between the central axle 5, the pinions 10, the blade carrying axles 3 and 4, so that this transmission of the driving force arrived from motor 11 into the blade carrying axles 3 and 4, connecting the motor to a central axle or shaft 5, which in turn serves as a force or speed multiplier, according to the size ratio used between its two pinions 8 and 8, or pinions 9 and 9, through its dual pulleys 6, located on each of the ends of the central axle, where at one end the connection is through band 7, or chain 9, to pulley 6 or pinon 10 or pinion 8, through chain 9, the motor generating the driving force, and at the other end of the central axle 5, transmits the driving force to the blade carrying axles 3 and 4, and also equally through two pinions 10, which interconnect through the help of a fourth pinion 10, which connect directly to their equals, the pinions 10 of the blade carrying axles 3 and 4, which connects to the central axle 5, through the chain 9 that connects to pinon 8, with the equal pinions 8 of the blade carrying axles 3 and 4, which like central axle 5, has the possibility of connecting with pulley 6, connecting to similar pulleys 6, of the blade carrying axles 3 and 4, by means of the band 7 of the central axis of multiplier or speed multiplier, in which again the variation of speed depends on the difference of the number of teeth between pinions 10 and 10 or 8 and 8 at the ends of the central axle 5. Similarly, when these are used in different diameters at the end pulleys 6 of the central axle, the speed of the blade carrying axles 3 and 4 is variable. These shredding machines 1, can have combined gear mesh or force transferring components comprised of pulleys 6, that engage the motor with the central axle, or pinions 10 or 8, with the other end of the central axle 5, where it can engage with its counterparts set of pinions 10 or 8, or with complementary sets of pulleys 6. These blade carrying axles 3 and 4, are arranged to be used with sets of four blades 17, six blades, and eight blades 18, having Y shapes 14, or T 15, with an inverted L shape at the end of the blade 2, and an F mirror at the end of FIG. 2, inverted by each of the peripheral lines of each of its axles, at speeds that are determined by the set of pinions or pulleys of the central axle 5. The rotating axis of the blade carrying axles 3 and 4 is composed of several axles of the blades 2 in line, on all the peripheral surfaces of these axles 3 and 4, which by their equidistant location in a line of rotation, allow them to rotate in the opposite direction of the lines of blades 2, of the opposite blade carrying axles 3 and 4. Through this effect the portions of meat that are deposited between the two blade axles through the opening in the tray, get shredded, leaving loose fibers.

This machine has been designed to solve the relative unsanitary, unclean and slow process resulting from shredding large quantities of meat fibers (be it beef, chicken, pig, etc.) manually. The manual process exposes the meat to cross contamination, which is avoided in this machine through the use of aseptic materials such as stainless steel.

To complement the above description and in order to help a better understanding of the characteristics of the invention, the descriptive chapter is accompanied by the figures in which the following is illustrated:

DESCRIPTION OF THE DRAWINGS

This invention is about a machine which loosens or shreds the fibers of different meats for human consumption, be they chicken, beef, pork, etc. It is characterized by having two parallel axles that rotate in the same direction so that when the meat is inserted between the axles the opposed blade motion shreds and tears the meat fibers, where the size of the resulting meat chunks/pieces is determined by the distance between the blades of the axles that cross each other. This machine has different force transmission components so as to determine both the strength (torque) and speed of the blade carrying axles, which in turn mesh with these blade carrying axles through interconnected pinions, chains, pulleys that have belts. These shredders may use these transmission mesh gears combining both pulleys and pinions that inter-mesh or vice versa.

BRIEF DESCRIPTION OF THE DRAWINGS

Figure 1:
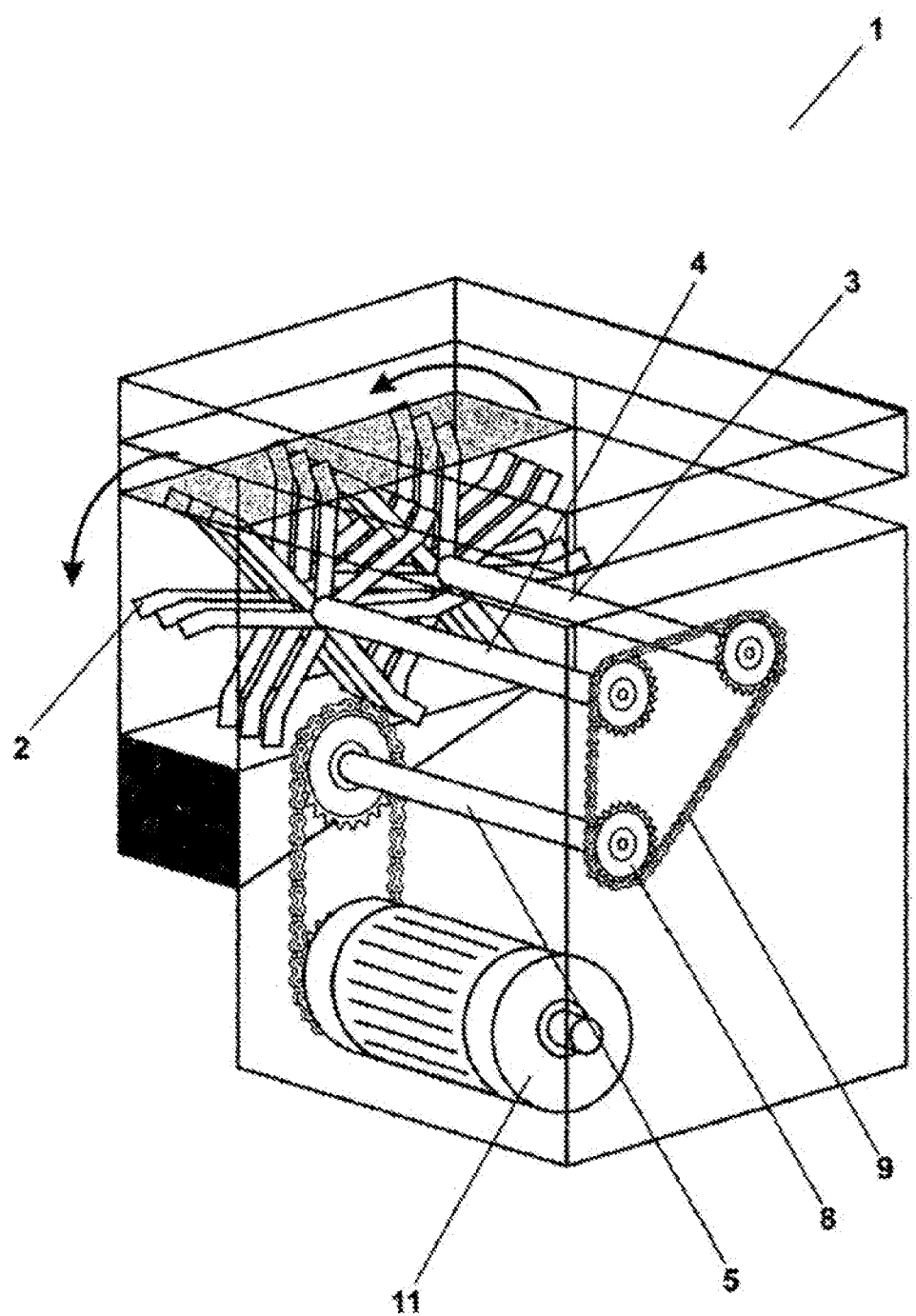

FIG. 1 shows a top perspective view of the shredder moved through pinions and chains.

Figure 2:
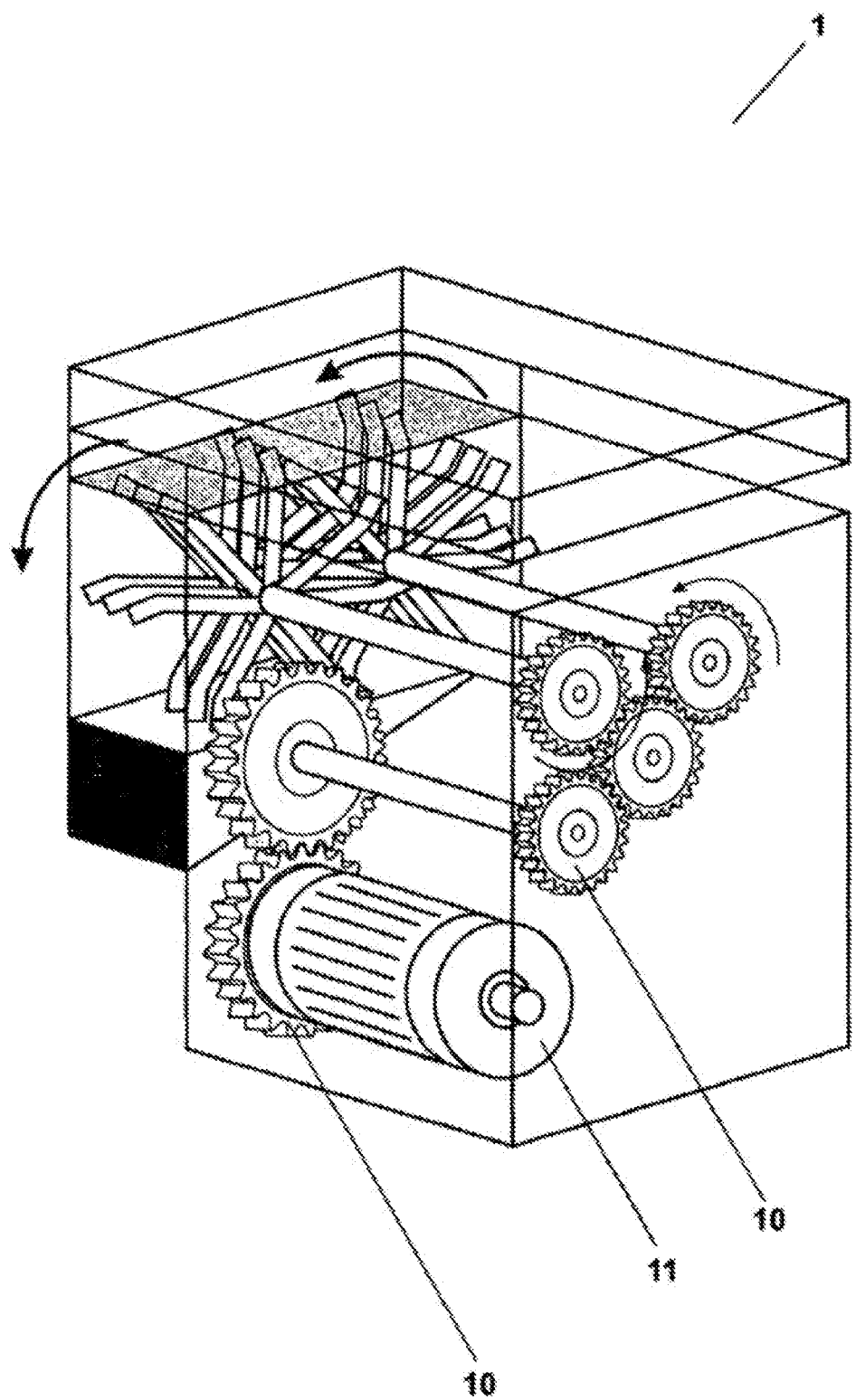

FIG. 2 shows a top perspective view of the shredder moved by pinions that mesh with each other.

Figure 3:
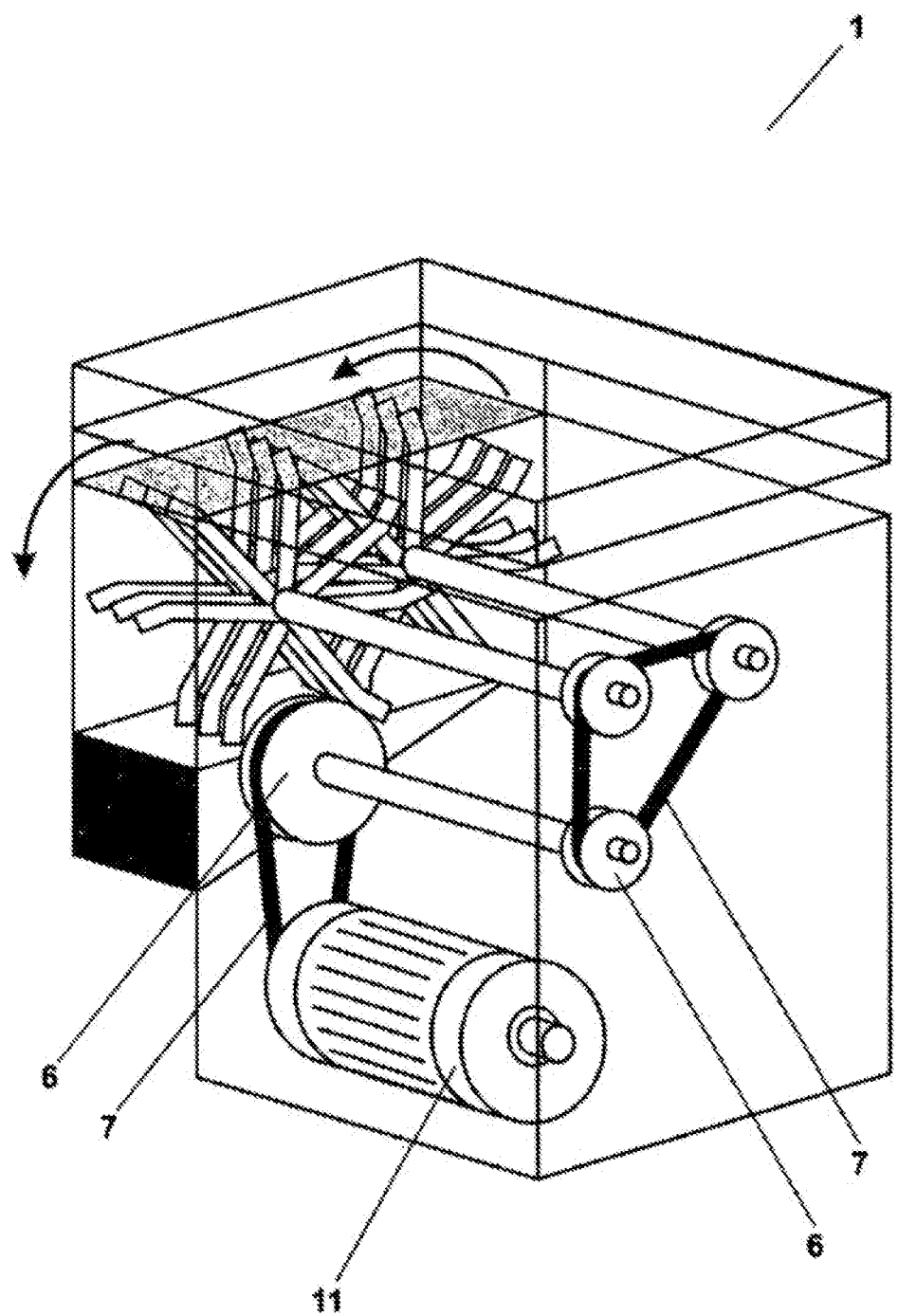

FIG. 3 shows a top perspective view of the shredder moved by pulleys and bands.

Figure 4:
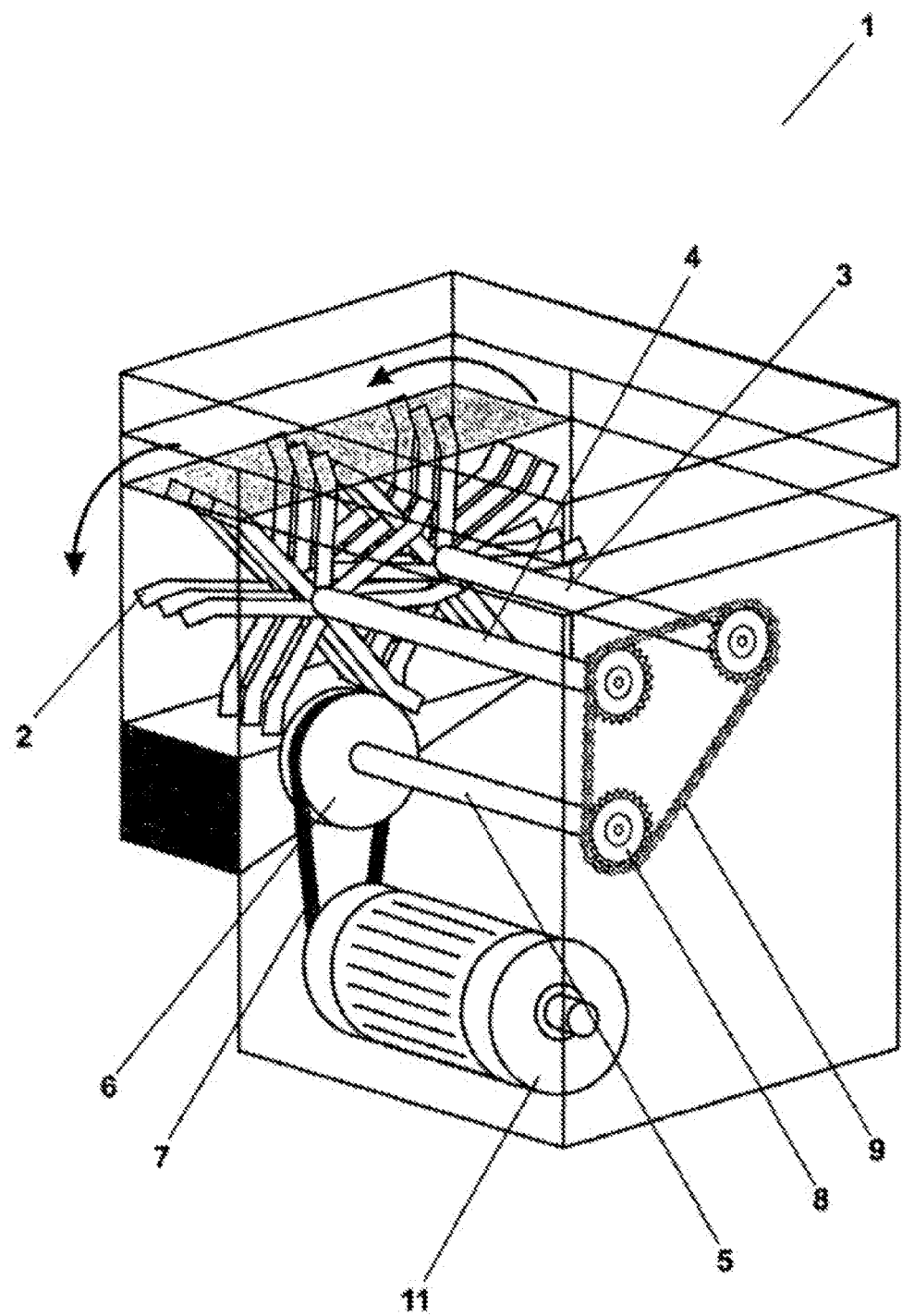

FIG. 4 shows a top perspective view of the shredder moved by band and pulleys as well as with band and chains using pinions.

Figure 5:
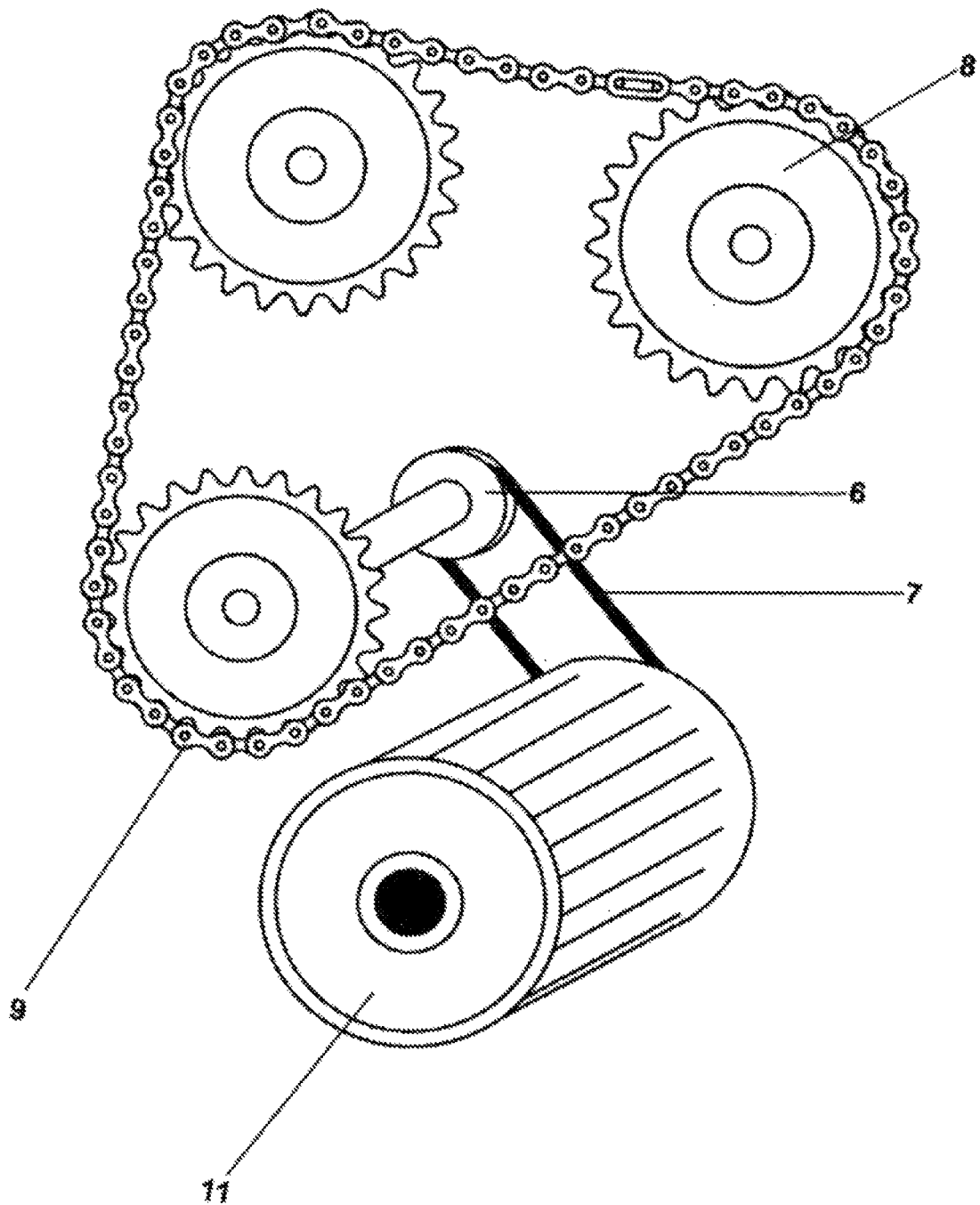

FIG. 5 shows a top perspective view of the shredder moved by pinions that mesh through chains.

Figure 6:
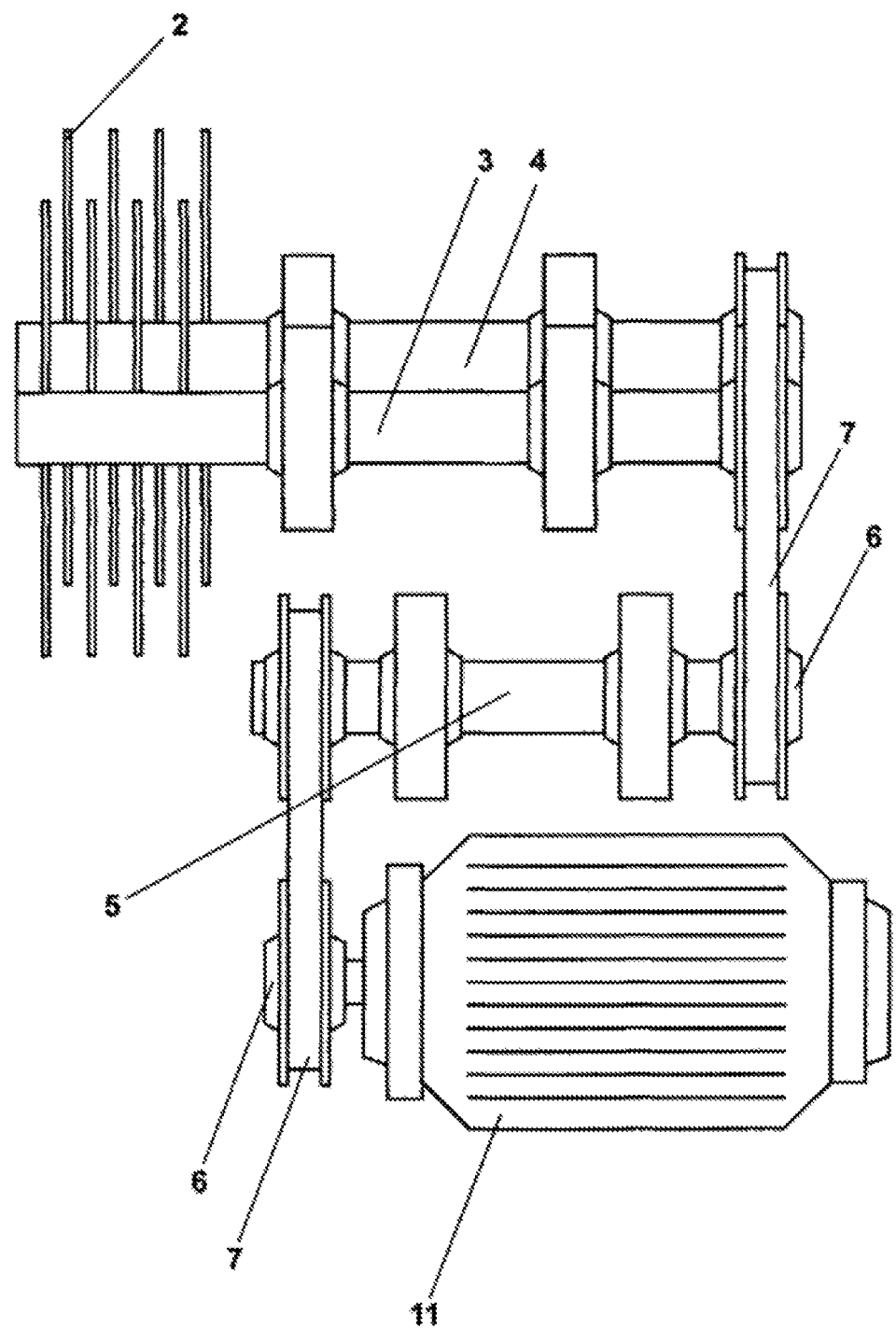

FIG. 6 shows a top perspective side view of the shredder moved by belt pulleys.

Figure 7:
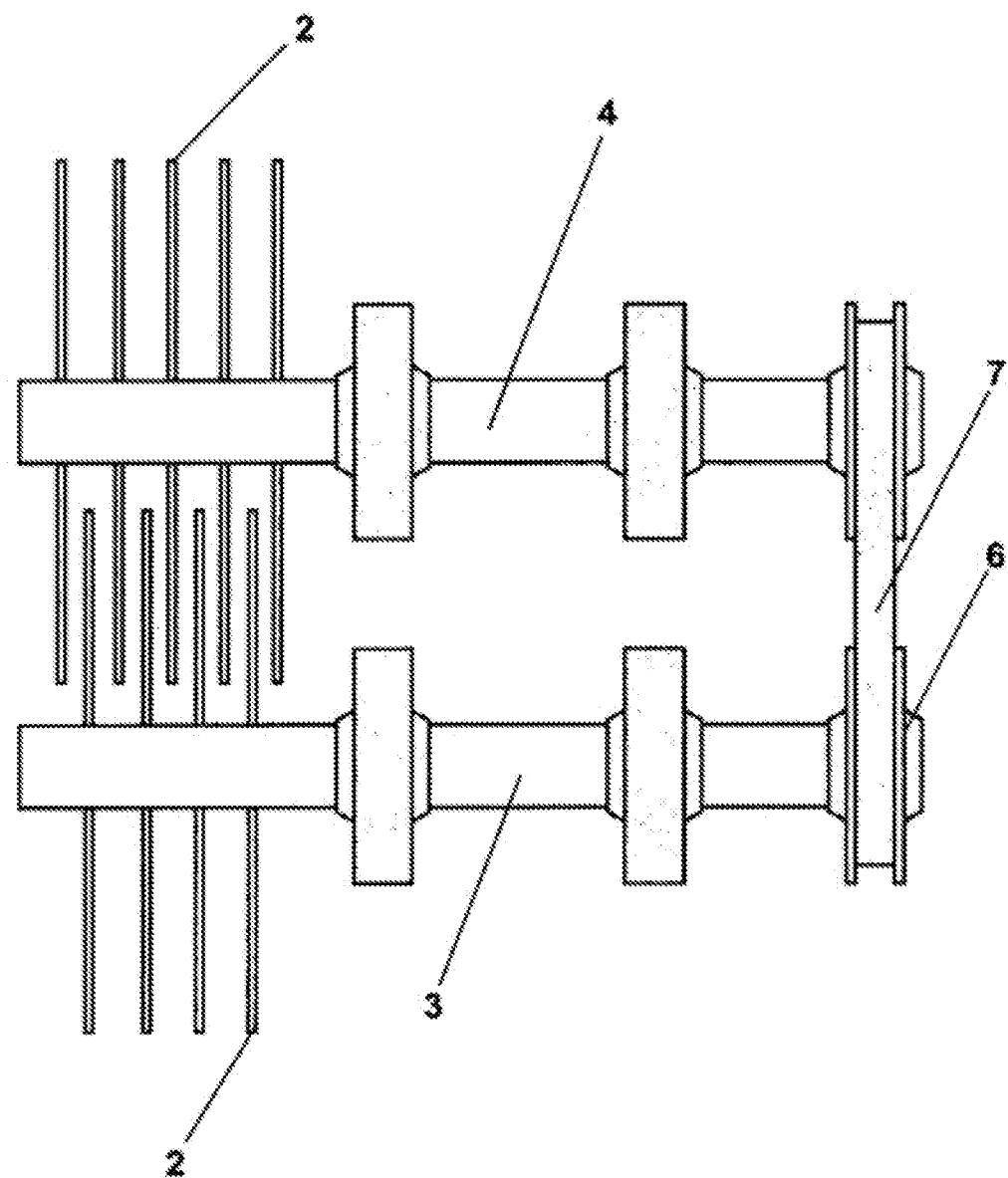

FIG. 7 shows a view from above the axles moved by a band, showing the lines of interleaved blades.

Figure 8:
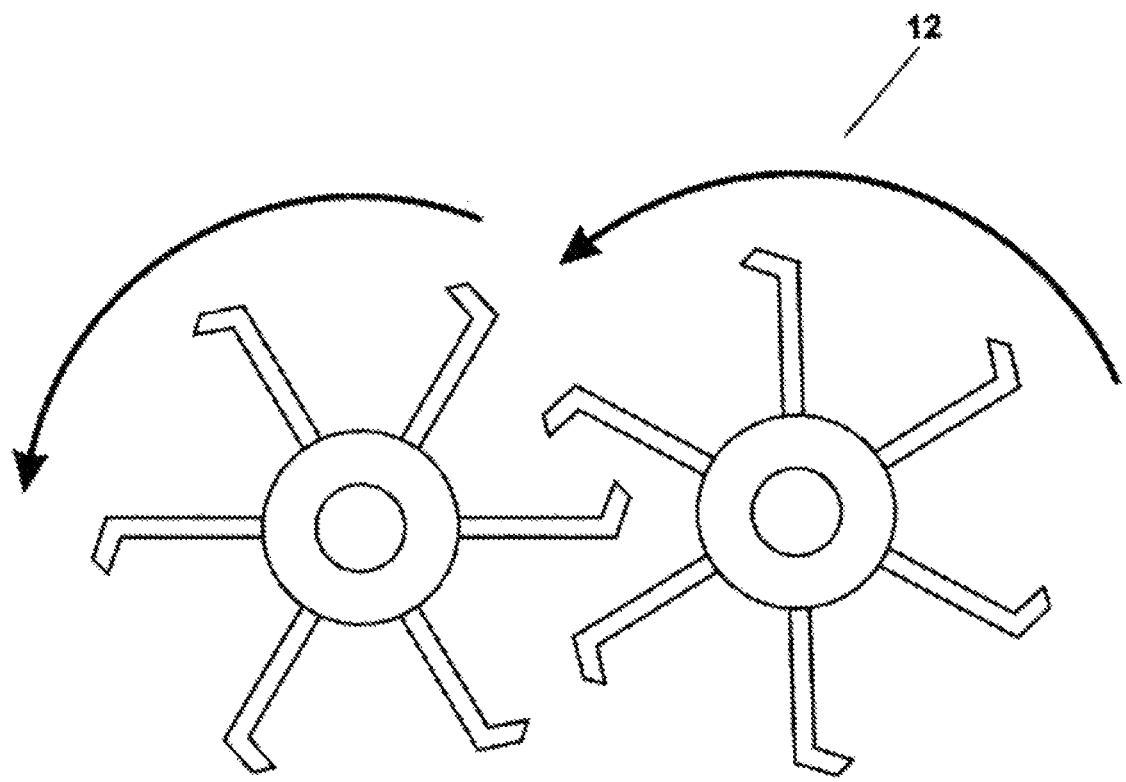

FIG. 8 shows a front view of the blade carrying axles with their blades having an inclined forward form, and the axles moved by a band and shows the lines of interleaved blades.

Figure 9:
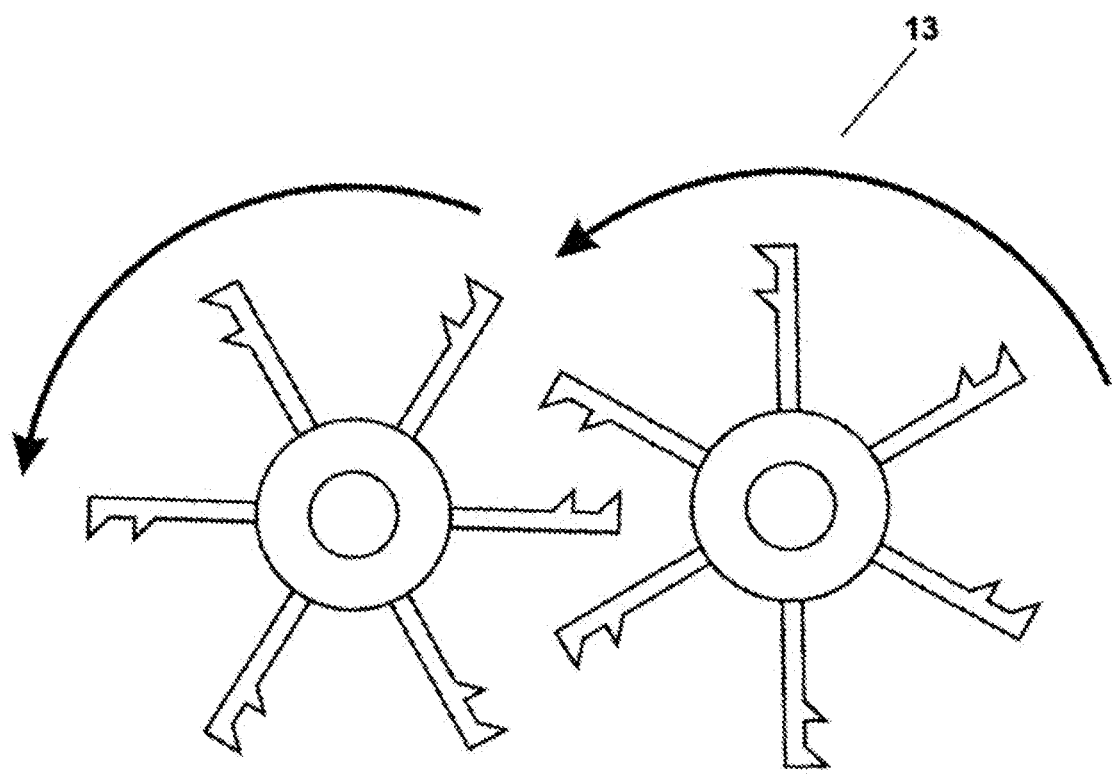

FIG. 9 shows a front view of the blade carrying axles with their blades having a straight shape and a double line inclined forward of the axles moved by a band, showing the lines of interleaved blades.

Figure 10:
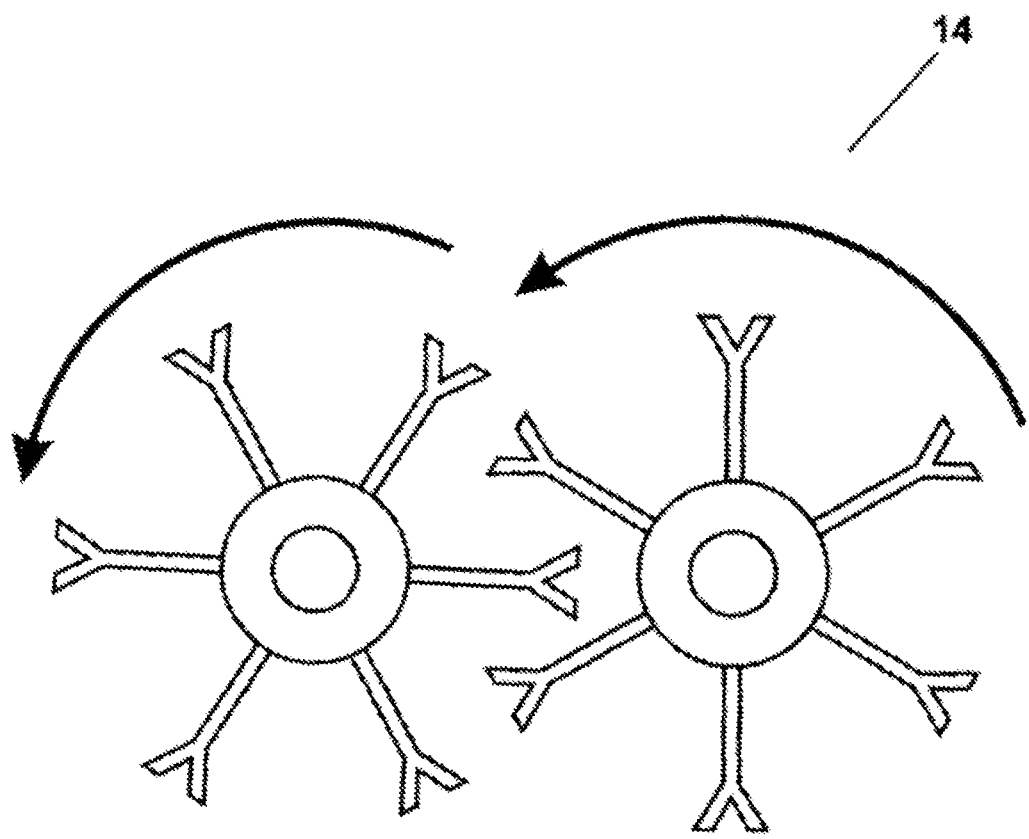

FIG. 10 shows a front view of the blade carrying axles having six straight-shaped blades whose tip goes in the shape of a Y.

Figure 11:
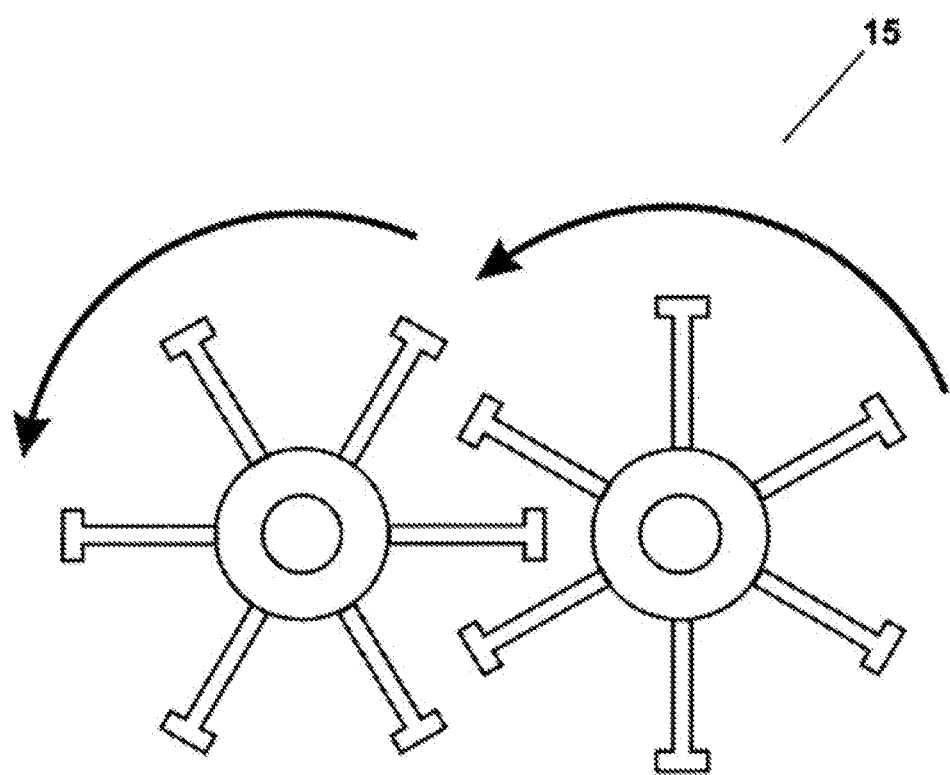

FIG. 11 shows a front view of the cutter shafts with six straight-shaped blades whose tip goes in the shape of a T.

Figure 12:
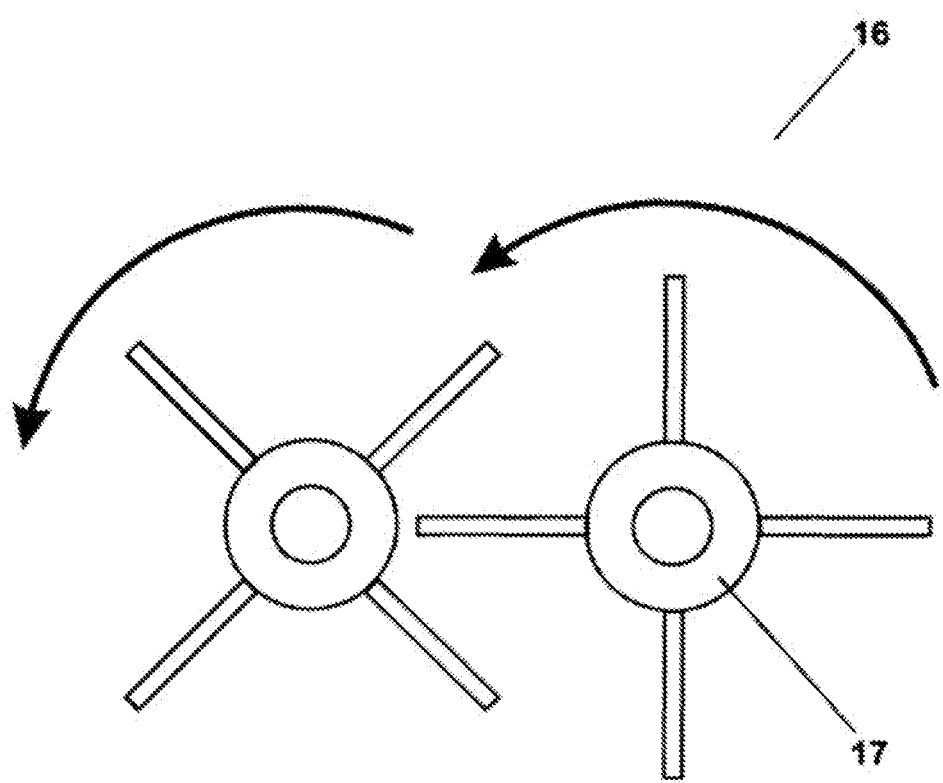

FIG. 12 shows a front view of the knife holder shafts with four straight-shaped blades.

Figure 13:
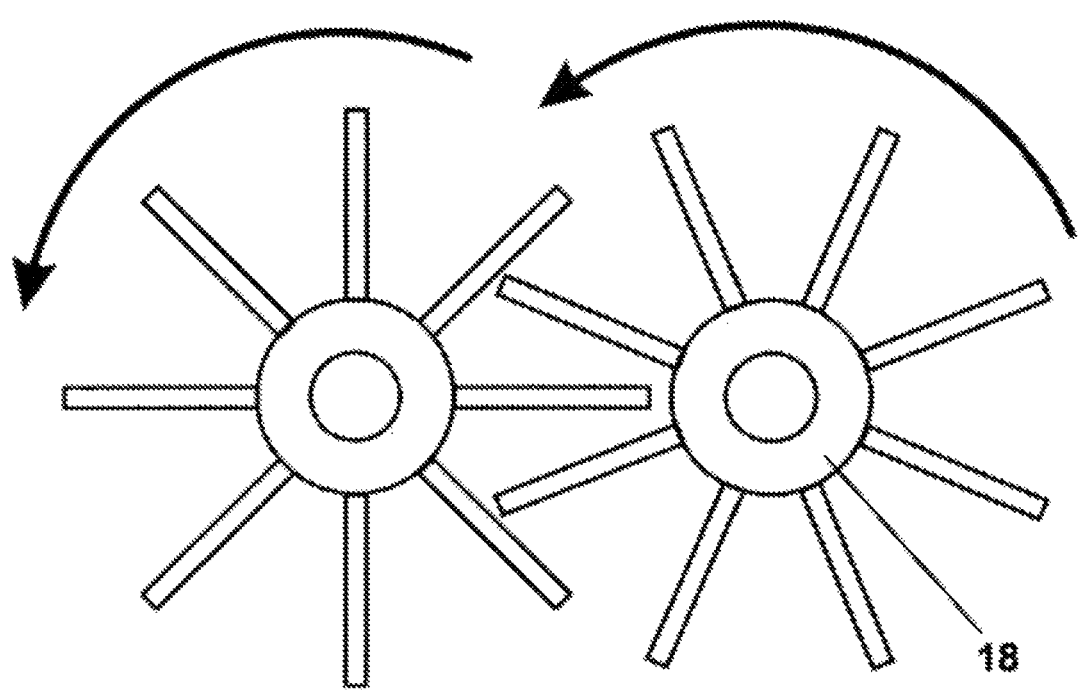

FIG. 13 shows a front view of the knife holder shafts with four straight-shaped blades.

DETAILED DESCRIPTION OF THE DRAWINGS

FIG. 1 shows the shredding machine for chicken, beef and pork 1, with its blade carrying axles 3 and 4, where the blades 2, counter-rotating through the power delivered by the motor 11 drives the pinions 8, moved by the chains 9 whose position is moved by pinions and chains mounted on the central axle 5.

FIG. 2 shows the shredding machine for chicken, beef and pork 1, powered by the motor 11, which moves the pinions 10, which mesh with each other.

FIG. 3 shows the shredding machine for chicken, beef and pork 1, driven by the motor 11, which moves the pulleys 6, which transmit through bands 7.

FIG. 4 shows the shredding machine for chicken, beef and pork 1, driven by the motor 11, which moves the pulleys 6 with bands 7, which by means of the central axle 5, transmit the force through their other end pinions 8, with chain 9, to the blade carrying axles 3 and 4, to move their blades 2.

FIG. 5 shows the shredding machine for chicken, beef and pork 1, driven by the motor 11, which moves the pulleys 6 with bands 7, which by means of the central axis transmit their strength through pinions at their other end 8, with chain 9.

FIG. 6 shows the shredding machine for chicken, beef and pork 1, moved by pulleys 6, with bands 7, connecting to the motor 11, the central axle 5 and the blade carrying axles 3 and 4, as well as the lines of the equidistant shredding blades 2.

FIG. 7 shows the blade carrying axles 3 and 4, connected by the band that engages the pulleys 6, which move the blade carrying axles 3 and 4, and the lines of interleaved and equidistant blades 2.

FIG. 8 shows the blade carrying axles with their blades, in the form of an L during movement 12, which causes the interleaved blades to cross each other at the center of the two axles, the action through which the meat is shredded.

FIG. 9 shows the blade carrying axles with their six straight-bladed blades in double lines inclined forward like the letter F, also showing when the wings in the center of the axles rotate against each other, above and below, action by which the flesh is dismembered and shredded.

FIG. 10 shows the blade carrying axles having six straight-shaped blades whose tip is shaped like Y.

FIG. 11 shows the blade carrying axles having six blades with a straight shape whose tip is T-shaped, with the effective counter-rotation in its central part between axles.

FIG. 12 shows the blade carrying axles having four blades 17 shaped straight in rotation 16.

FIG. 13 shows the blade carrying axles having eight blades with a straight shape in central counter rotation.

ELEMENTS LIST

Machine for Shredding of Meat (Chicken, Beef or Pork)
1. Shredding machine.
2. Thinning blades.
3. A blade holder.
4. Two blade holder shaft.
5. Central axle with speed ratio, transmitter of motive power from the motor to the axes carrying blades.
6. Pulleys for the transmission of motive power of the shafts when moved by bands.
7. Transmitting bands of motive power means of motor pulleys through the central axle to the blade carrying axles.
8. Pinions for use when the transmission of the driving force is through chains.
9. Chain for transmission of power by pinons.
10. Pinions that mesh directly with each other.
11. Motor.
12. L-shaped blades, which create the counter-clockwise movement on one side, the clockwise on the other, so that blades meet in the center of the axles, some raise others lower, action by which meat is shredded.
13. Blades with F-shape or double point, which create the counter-clockwise movement on one side, the clockwise on the other, so that blades meet in the center of the axles, some raise others lower, action by which meat is shredded.
14. Y shaped blades.
15. T-shaped blades
16. Turning of the knife-holder axles in counter-clockwise, which causes the blades to rotate in half of the two axles.
17. Blade holder axles with four blades per peripheral line of the blade holder shaft.

18. Blade holder axles with eight blades per peripheral line of the blade holder shaft.

The invention claimed is:

1. A chicken, beef or pork meat shredder, said meat shredder comprising:
two blade carrying axles (3) and (4), wherein each said axle has one or more straight blades that may be placed in up to four equidistant locations, so as to rotate in parallel with a similar opposite blade carrying axle (3) or (4), and not to have the blades collide with each other; a motor (11), which transfers the driving force through pinions (8) by its chains (9) or other transmission components; and
wherein the motor (11) first connects to a central axle (5) with a force or speed multiplier provided by one of two pinions (8) located at each end, and axles with pinions, to transmit at the other end with other pinion (8) that transmit the force and speed to blade carrying axle (3) and (4) through the chain (9) that connects their pinions (8).

2. The chicken, beef or pork meat shredder of claim 1 further comprising:
bands (7) as a means of transmission of force of the motor (11) towards the blade carrying axles (3) and (4) that connect their pulleys (6) to transmit the driving force to the central axle speed variator (5), where the ratio of speed difference that is transmitted to the pulleys (8) of the blade carrying axles (3) and (4) are provided by the difference in diameter between pulleys (6) located at each end of the central axle (5).

3. The chicken, beef or pork meat shredder of claim 1 further wherein:
another means of transmitting force of the motor (11) to the blade carrying axles (3) and (4), that is driven by pinions that mesh with each other (10), which initially transmit the driving force to the central axle speed variator (5), where the speed ratio that transmits to the pinions (10) of the blade carrying axles (3) and (4) is determined by the given number of gear teeth and different diameters of the pinions (10) located in each of the ends of the central axle (5) that finally connects with pinions (10) of the blade carrying axles (3) and (4).

4. The chicken, beef or pork meat shredder of claim 3 wherein;
the means transmission of force from the motor (11) to the blade carrying axles (3) and (4) is determined by the mixed use of two of the three transmission means, where the pulley (6) of the motor (11) through the band (7) connects the pulley (6) to the central axle speed variator (5), which at the other end with its pin (8) connects to the pinions (8) of the blade carrying axles (3) and (4) through the chain (9), this option can use the reverse, with the pinions (8) with chains (9) between the motor (11) and the central axle (5) and between this axle (5) and the blade carrying axles (3) and (4) transmitting through the pulley (6) with the band (7) its pulley (6).

5. The chicken, beef or pork meat shredder of claim 4 wherein;
the means of transmission of motor force (11) to the blade carrying axles (3) and (4), are determined by the mixed use of two of the three transmission media, Where the pulley (6) of the motor (11) through the band (7) connects the pulley (of the central speed variator shaft (5), which at the other end with its direct gear pinion (10) engage the pinions (10) of the blade carrying axles (3) and (4) this option can be used in reverse, with the pinions of direct gear (10) located in between the motor (11) and the central axle (5) which transmits the traction at the other end by its pulley (6) through the band (7) that connects the pulleys (6) of the blade carrying axles (3) and (4).

6. The chicken, beef or pork meat shredder of claim 1 wherein;
the flat blades (2) have an L shape at their ends.

7. The chicken, beef or pork meat shredder of claim 6 wherein;
the flat blades (2) have an F shape in both directions at their ends.

8. The chicken, beef or pork meat shredder of claim 6 wherein;
the flat blades (2) have an Y or T shape at their ends.

9. The chicken, beef or pork meat shredder of claim 6 wherein;
the lines of each of the perimeter groups of the blades are formed by 4, 6 or 8 blades.

10. A chicken, beef or pork meat shredder comprising:
two blade carrying axles, a first and a second, each said axle having rotation means, with each said axle having one or more pairs of straight blades protruding from opposite sides of said axle, each said pair of blades longitudinally placed along each said axle at up to four equidistant locations along each axle, but offset from each said first and second axles so that as each said blade pair on each said axle rotates yet does not collide with each other;
a motor having rotation means, wherein said motor connects through one or more rotational means mechanically linking said motor to a central axle that in turns is mechanically linked to said first and second axles; and
a mechanical housing, said mechanical housing having two compartments, a first compartment housing said motor and said axles and a second compartment housing said blades.

11. The chicken, beef or pork meat shredder of claim 10 wherein:
said rotational means are comprised of one or more bands connecting to one or more crank pulleys so as to transfer the motor rotation from said motor to said first and second blade axles; and
wherein the ratio of speed difference that is transmitted to said crank pulleys on said first and second blade carrying axles is provided by the difference in diameter between said crank pulleys at each end of said central axle.

12. The chicken, beef or pork meat shredder of claim 11 wherein:
the flat blades (2) have an L shape at their ends.

13. The chicken, beef or pork meat shredder of claim 12 wherein:
the flat blades (2) have an F shape in both directions at their ends.

14. The chicken, beef or pork meat shredder of claim 12 wherein:
the flat blades (2) have an Y or T shape at their ends.

15. The chicken, beef or pork meat shredder of claim 10 further wherein:
said rotational means are comprised of one or more chains connecting to one or more sprockets so as to transfer the motor rotation from said motor to said first and second blade axles; and
wherein the ratio of speed difference that is transmitted to said one or more sprockets on said first and second blade carrying axles is provided by the difference in diameter between said sprockets at each end of said central axle.

16. The chicken, beef or pork meat shredder of claim 15 wherein:

the flat blades (2) have an L shape at their ends.

17. The chicken, beef or pork meat shredder of claim 15 wherein:

the flat blades (2) have an F shape in both directions at their ends.

18. The chicken, beef or pork meat shredder of claim 15 wherein:

the flat blades (2) have an Y or T shape at their ends.

19. The chicken, beef or pork meat shredder of claim 10 further wherein:

said rotational means are comprised of one or more gears connected to transfer the motor rotation from said motor to said first and second blade axles; and wherein the ratio of speed difference that is transmitted to said one or more sprockets on said first and second blade carrying axles is provided by the difference in diameter between said sprockets at each end of said central axle.

20. The chicken, beef or pork meat shredder of claim 10 further wherein:

said rotational means are comprised of a combination of one or more of chains/sprockets, belts/crank pulleys or gears mechanically coupling said motor to said two or more axles, including said first and second axles; and wherein the ratio of speed difference that is transmitted to said one or more sprockets on said first and second blade carrying axles is provided by the difference in diameter between said chains, sprockets or gears at each respective axle.

* * * * *